(Model.)

M. T. McCLAIN.
COTTON PLANTER.

No. 247,842. Patented Oct. 4, 1881.

WITNESSES:

By his Attorneys

INVENTOR.

UNITED STATES PATENT OFFICE.

MAJOR T. McCLAIN, OF GUNTOWN, MISSISSIPPI.

COTTON-PLANTER.

SPECIFICATION forming part of Letters Patent No. 247,842, dated October 4, 1881.

Application filed February 26, 1881. (Model.)

*To all whom it may concern:*

Be it known that I, MAJOR T. McCLAIN, of Guntown, in the county of Lee and State of Mississippi, have invented certain new and useful Improvements in Cotton-Planters; and I do hereby declare that the following is a full, clear, and exact description of the invention, which will enable others skilled in the art to which it appertains to make and use the same, reference being had to the accompanying drawings, which form a part of this specification.

Figure 1:
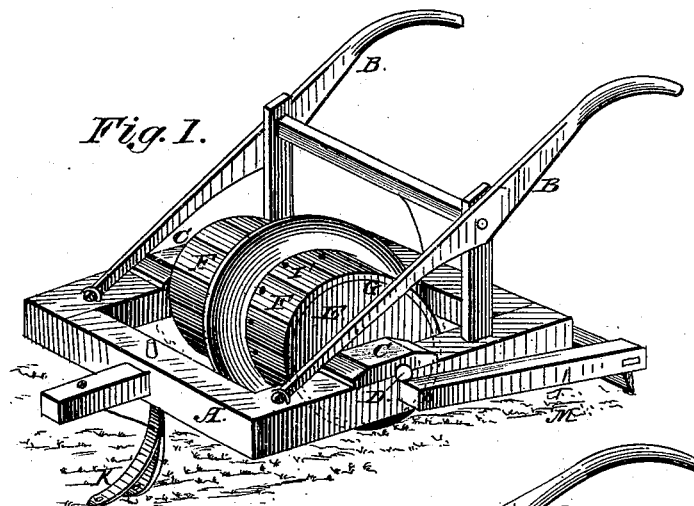
Figure 2:
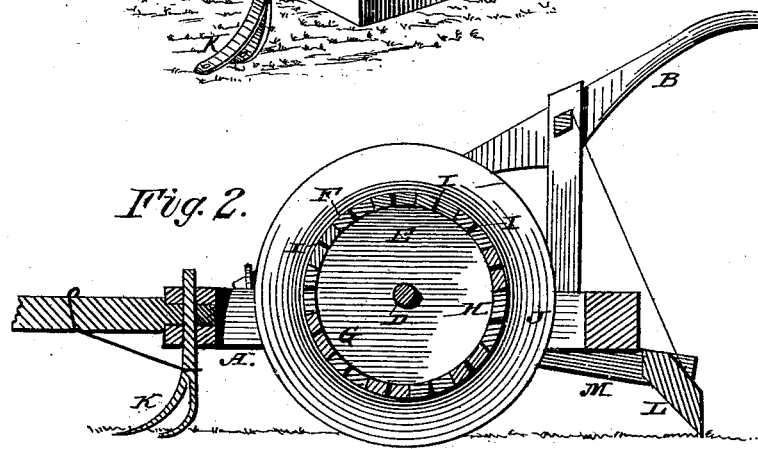
Figure 3:
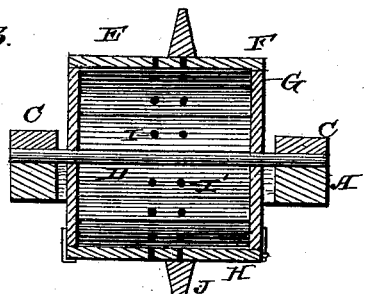
Figure 4:
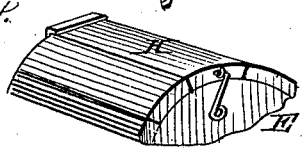

Figure 1 is a perspective view. Fig. 2 is a longitudinal vertical sectional view. Fig. 3 is a vertical cross-section, and Fig. 4 is a detail view.

Corresponding parts in the several figures are denoted by like letters of reference.

This invention relates to that class of cotton-seed planters which are provided with a rolling hopper; and it consists in the combination, with the drum having two circumferential series of openings, of a laterally-adjustable rim or tire arranged upon the drum, as hereinafter more fully described.

In the drawings hereto annexed, A represents a suitably-constructed rectangular frame, having handles B B suitably secured to the sides, which are also provided with boxes or bearings C C for the axle D. The latter carries the rolling hopper or drum E, which is cylindrical in shape, consisting of slats F, secured to the circular heads G, which are thus connected. One of the slats, H, is loose and is dovetailed between the two adjoining slats, so as to be capable of being slid out sidewise when seed is to be placed in the drum or hopper.

The drum E is provided with a circumferential series of openings, I, for the escape of seed. Adjoining said openings is secured a V-shaped rim or tire, J, which travels in the furrow made by the plow K, and serves not only to guide the machine, but also partly to pack the soil over the seed. A covering-beam, L, is secured between two arms, M, pivoted to the sides of the frame.

The rim or tire J may be made adjustable or capable of sliding laterally upon the drum or hopper, which may then be provided with two series, I I', of openings of unequal size or unequal distances apart, or both, one of said series being covered by the tire during operation. The advantage of this construction will be obvious.

To hold the sliding slat or cover H in position a suitable latch may be employed, substantially as shown in Fig. 4 of the drawings.

The operation and advantages of my invention will be readily understood from the foregoing description, taken in connection with the drawings hereto annexed. It is simple, inexpensive, and is capable of planting upon any land which is capable of being broken.

Having thus described my invention, I claim and desire to secure by Letters Patent of the United States—

In a rolling-hopper cotton-planter, the combination, with the drum E, having openings I I', of the laterally-adjustable rim or tire J, substantially as and for the purpose shown and specified.

In testimony that I claim the foregoing as my own I have hereto affixed my signature in presence of two witnesses.

MAJOR T. McCLAIN.

Witnesses:
 JOSEPH LONG,
 GEORGE LONG.